United States Patent
Bailuk

(10) Patent No.: US 11,543,036 B1
(45) Date of Patent: Jan. 3, 2023

(54) ISOLATION KNIFE GATE VALVE

(71) Applicant: 1441599 Alberta Ltd., Edmonton (CA)

(72) Inventor: Bradley Bailuk, Delta (CA)

(73) Assignee: 1441599 Alberta Ltd., Edmonton (CA)

(*) Notice: Subject to any disclaimer, the term of this patent is extended or adjusted under 35 U.S.C. 154(b) by 0 days.

(21) Appl. No.: 17/356,462

(22) Filed: Jun. 23, 2021

(51) Int. Cl.
*F16K 3/02* (2006.01)
*F16K 3/316* (2006.01)
*F16K 27/04* (2006.01)

(52) U.S. Cl.
CPC .......... *F16K 3/0281* (2013.01); *F16K 3/0227* (2013.01); *F16K 3/0272* (2013.01); *F16K 3/316* (2013.01); *F16K 27/044* (2013.01)

(58) Field of Classification Search
CPC ...... F16K 3/0281; F16K 3/0227; F16K 3/316; F16K 27/044; F16K 3/0272
USPC .................. 251/326–329, 360–363
See application file for complete search history.

(56) References Cited

U.S. PATENT DOCUMENTS

| | | | |
|---|---|---|---|
| 2,550,984 A | | 5/1951 | Ferguson |
| 2,701,177 A | | 2/1955 | Bashark |
| 2,731,231 A | | 1/1956 | Garrott |
| 2,825,528 A | | 3/1958 | Truitt |
| 3,000,608 A | | 9/1961 | Williams |
| 3,036,813 A | * | 5/1962 | Headrick ................ E21B 34/02 251/328 |
| 3,071,343 A | * | 1/1963 | Milleville ............. F16K 3/0227 251/266 |
| 4,009,727 A | | 3/1977 | Bailey |
| 4,377,274 A | | 3/1983 | Mayhew |
| 4,483,514 A | | 11/1984 | Kennedy |
| 4,703,915 A | * | 11/1987 | King ..................... F16K 3/0281 251/328 |
| 4,773,627 A | * | 9/1988 | King ..................... F16K 3/0281 251/328 |
| 4,798,365 A | * | 1/1989 | Mayhew ............... F16K 3/0281 251/328 |
| 5,014,730 A | | 5/1991 | Fye |
| 5,295,661 A | * | 3/1994 | Roussel ................. F16K 3/184 251/204 |

(Continued)

FOREIGN PATENT DOCUMENTS

| | | |
|---|---|---|
| CA | 1286649 | 7/1991 |
| CA | 2093539 | 12/1993 |

(Continued)

OTHER PUBLICATIONS

Elite Valve, E5600 High-Performance Perimeter Seated Knife Gate Valve, Brochure from elitevalve.com, 2 pages.

(Continued)

*Primary Examiner* — John Bastianelli
(74) *Attorney, Agent, or Firm* — Christensen O'Connor Johnson Kindness, PLLC

(57) ABSTRACT

An isolation knife gate valve has a valve body including pipe couplings. Removable face sealing elements are attached on either side of the valve body interior to the pipe couplings. A perimeter seal may also be mounted within the valve body. The face sealing elements may include flexible seal elements extending around the opening. The flexible seal elements may cooperate with the perimeter seal, having portions contacting side surfaces of the perimeter seal and other portions contacting faces of the valve gate.

17 Claims, 9 Drawing Sheets

(56) References Cited

U.S. PATENT DOCUMENTS

| | | | |
|---|---|---|---|
| 5,653,423 A * | 8/1997 | Young | F16K 3/0281 |
| | | | 251/360 |
| 6,959,912 B2 * | 11/2005 | Reeves | F16K 41/04 |
| | | | 251/327 |
| 7,350,766 B2 | 4/2008 | Comstock et al. | |
| 7,458,559 B2 * | 12/2008 | Blenkush | F16K 3/0281 |
| | | | 251/327 |
| 7,866,629 B2 * | 1/2011 | Harlow | F16K 3/02 |
| | | | 251/193 |
| 2007/0007484 A1 * | 1/2007 | Zellweger | F16K 3/314 |
| | | | 251/327 |
| 2009/0236554 A1 | 9/2009 | Gifford et al. | |
| 2013/0026407 A1 * | 1/2013 | Choo | F16K 3/0227 |
| | | | 251/326 |
| 2018/0252322 A1 * | 9/2018 | Sidler | F16K 3/0227 |

FOREIGN PATENT DOCUMENTS

| | | |
|---|---|---|
| CA | 2196860 | 8/1997 |
| CA | 2240308 | 1/1999 |
| CA | 2246922 | 2/2000 |
| CA | 2560666 | 10/2005 |
| CA | 2489079 | 6/2006 |
| CA | 2631667 | 6/2007 |
| CA | 2594083 | 1/2008 |
| CA | 2808523 | 2/2012 |
| CA | 2874159 | 12/2013 |
| CA | 2898592 | 7/2014 |
| CA | 2921328 | 2/2016 |
| CA | 2956125 | 3/2016 |
| CA | 2930800 | 11/2016 |
| CA | 3028796 | 10/2017 |
| WO | 2007/121564 | 11/2007 |
| WO | 2016/196818 | 12/2016 |
| WO | 2017/124192 | 7/2017 |

OTHER PUBLICATIONS

Dezurik KBD Bi-Directional Knife Gate Valves, Brochure, May 2001, p. 1-4, SPX Valves & Controls, Minnesota, U.S.A.

DSS Valves Instruction, Operation and Maintenance Manual Severe Service Knife Gate Valve, Manual from dssvalves.com, at least as early as Oct. 19, 2020, p. 1-24, DSS Valves, U.S.A.

Elite Valve, Knife Gate Valve, Brochure from elitevalve.com, 2018, 24 pages, Elite Valve, Oakville, Ontario, Canada.

Fabri-Valve, 539 Slide Gate Valve, Manual, p. 1-4, 2004, ITT Industries, U.S.A.

FNW, Knife Gate Valves, Installation, Operation & Maintenance Instructions, at least as early as Oct. 19, 2020, p. 1-7.

Jash, Knife Gate Valves DN 50—DN 400, Catalogue, at least as early as Oct. 19, 2020, 24 pages, Jash Engineering Ltd , Indore, India.

FNW, Stainless Lined Resilient Seated Knife Gate Valve, Manual from fnw.com, 2011, 4 pages, Ferguson Enterprises, Inc., Virginia, U.S.A.

VAAS, Valves with the Leading Edge, Pamphlet, at least as early as Oct. 15, 2020, 24 pages, VAAS Industries Pvt. Ltd., India.

VAAS, Options for uni-directional knife gate valves, Brochure, Aug. 2011, p. 1-12.

DSS Valves, What is a Knife Gate Valve?, Webpage from dssvalves.com, at least as eariy as Dec. 23, 2020, 14 pages.

Bidirectional Knife Gate Valve, Series 740; Webpage from bray.com/valves-actuators-controls; at least as early as Dec. 9, 2021; 5 pages.

Elite Valve, E5100 Bidirectional General Purpose Knife Gate Valve; Webpage from elitevalve.com; at least as early as Dec. 9, 2021; 2 pages.

FNW Stainless Steel Line Resilient Seated Knife Gate Valve; Webpage from FNWValve.com; at least as early as Dec. 9, 2021; 4 pages.

* cited by examiner

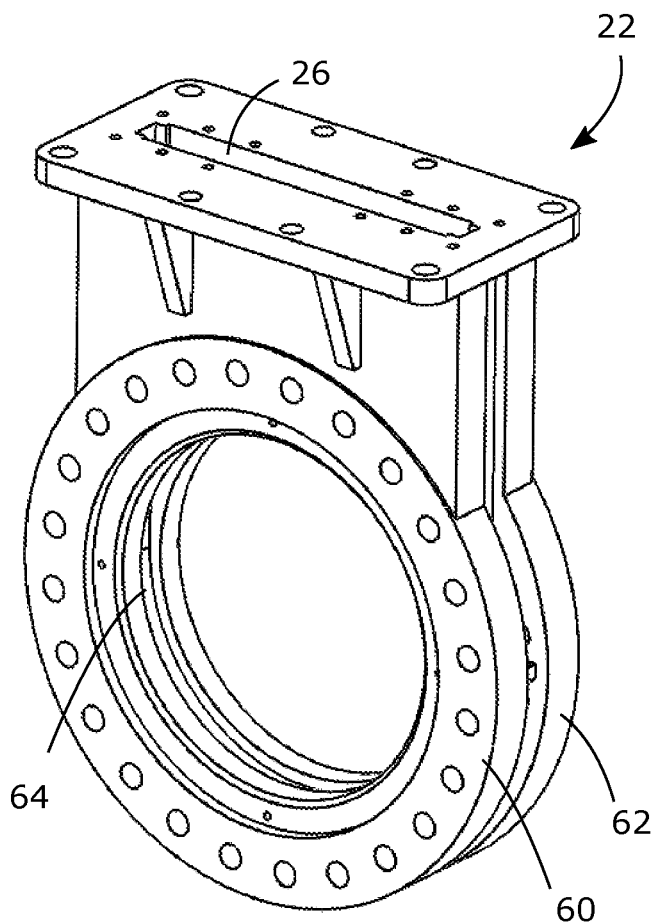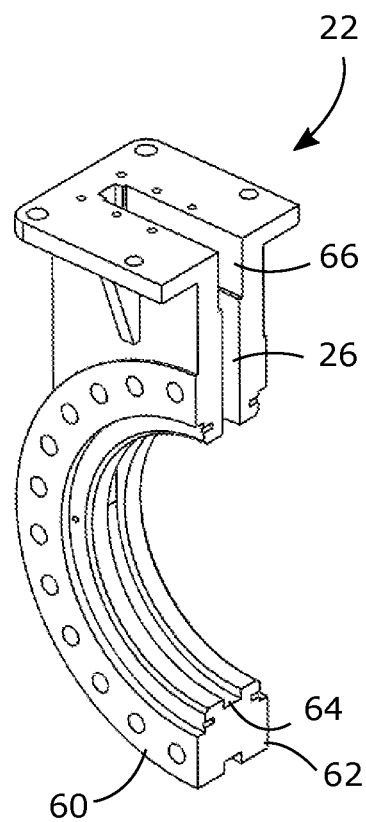
Fig. 11　　　　Fig. 12
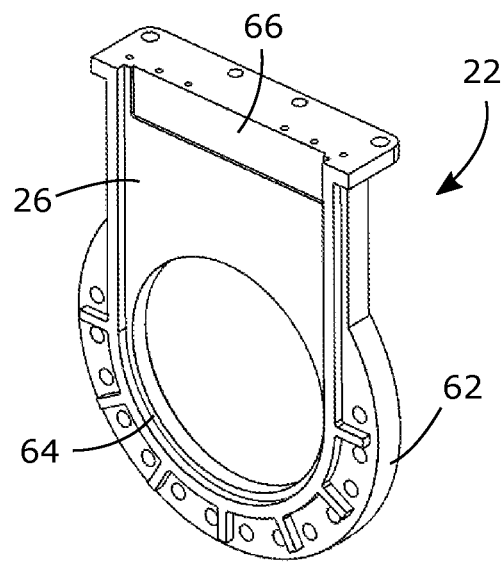
Fig. 13

ISOLATION KNIFE GATE VALVE

TECHNICAL FIELD

Isolation knife gate valves.

BACKGROUND

Isolation knife gate valves (Isolation KGV) typically seal either using a perimeter seal that extends around the perimeter of the gate ending at a packing seal or using a face seal that seals against the face of the gate. A face seal generally can only seal effectively in one direction of flow. Bidirectional sealing can be achieved by face seals on both sides of a gate, but this creates a pocket beneath the gate that is not exposed to much flow but is accessible to fluid passing through the valve when the valve is open. This pocket can collect debris which can eventually impede the closing of the isolation KGV. A perimeter seal ending at a packing seal provides bidirectional sealing without such a pocket, but it is difficult to provide fully leak-tight sealing with only a perimeter and packing seal particularly in valves that are large in size or under high pressures or especially both. Valves used in oilsands and mining, for example, can be upwards of 36 inches in diameter.

It is also desired for a KGV to have a strong uni-body construction and for the seals to be replaceable.

SUMMARY

An isolation knife gate valve has a valve housing including first and second pipe couplings for connecting to respective pipes, the valve housing defining an opening and a gate slot extending in a first direction away from the opening. A gate is movable within the gate slot opposite to the first direction to a closed position in which the gate obstructs the opening and in the first direction to one or more open positions, the gate having first and second faces. First and second face seal elements are removably attachable to the valve housing and when installed positioned interior to the couplings to seal against the first and second faces of the gate.

In various embodiments, there may be included any one or more of the following features: The valve housing may be a uni-body valve housing. The isolation knife gate valve may also include a perimeter seal mounted within the gate slot for sealing against the gate when the gate is in the closed position. The perimeter seal may also define first and second side surfaces, the first and second face seal elements when installed including respective first and second flexible seal elements extending around the opening, each of the first and second flexible seal elements having respective first portions respectively sealing against the first and second side sealing surfaces of the perimeter seal, the first and second flexible seal elements also having respective second portions sealing respectively against the first and second faces of the gate when the gate is in the closed position. The first and second flexible seal elements may each comprise an O-ring. When the isolation knife gate valve is in an operating fully open position, a portion of the first and second faces of the gate may remain in contact with the first and second flexible seal elements. The first and second face seal elements may also be configured to seal against the gate with a metal-to-metal seal. The perimeter seal may have a T-shaped cross section defining a thin portion of the perimeter seal and a bar of the perimeter seal, the thin portion contacting the gate and defining the first and second side surfaces. The perimeter seal may have a stiffening member extending lengthwise through the perimeter seal, the stiffening member being located substantially at a junction of the T-shaped cross section. The bar of the perimeter seal may be mounted in a groove in the valve housing, the first and second face seal elements overlapping edges of the groove to constrain the perimeter seal within the groove. Regardless of whether the perimeter seal has a T-shaped cross section, the perimeter seal may include a stiffening member extending lengthwise within the perimeter seal. The perimeter seal may have end portions extending along the gate slot away from the opening, the end portions sealing against respective sides of the gate. The end portions may extend to a transverse seal sealing against the faces of the gate within the gate slot. The valve housing may be configured to allow the gate and the transverse seal to be removable from the gate slot away from the opening, and to allow the perimeter seal to be removable from the gate slot away from the opening when the gate and the transverse seal are removed. Regardless of whether a perimeter seal is present, the first and second face seal elements when installed may include respective first and second flexible seals elements extending around the opening. The first and second flexible seal elements may each comprise an O-ring. When the isolation knife gate valve is in an operating fully open position, a portion of the first and second faces of the gate may remain in contact with the first and second flexible seal elements. The first and second face seal elements may also be configured to seal against the gate with a metal-to-metal seal. The first and second face seal elements may comprise bore liners. The bore liners may be configured to be flush with an internal diameter of the respective pipes. The first and second face seal elements may be configured to be bolted to the valve housing.

There is also provided a method of service of an isolation knife gate valve as described above. One or more of the first and second face seal elements is removed and repaired or replaced. The repaired or replaced one or more of the first and second face seal elements is then attached in installed position interior to the couplings.

There is also provided a method of service of the isolation knife as described above having a transverse seal and perimeter seal. The gate and the transverse seal are removed along the gate slot away from the opening. The first and second seal elements are also removed. The perimeter seal is then also removed along the gate slot away from the opening and repaired or replaced. The repaired or replaced perimeter seal is installed along the gate slot toward the opening. The gate, the transverse seal, and the first and second face seal elements or replacements are then reinstalled.

These and other aspects of the device and method are set out in the claims.

BRIEF DESCRIPTION OF THE FIGURES

Embodiments will now be described with reference to the figures, in which like reference characters denote like elements, by way of example, and in which:

FIG. 11 is an isometric view of a valve body of the valve of FIG. 1.

FIG. 12 is a cutaway isometric view of the valve body of FIG. 11.

FIG. 13 is another cutaway isometric view of the valve body of FIG. 11.

DETAILED DESCRIPTION

Immaterial modifications may be made to the embodiments described here without departing from what is covered by the claims.

Figure 1:
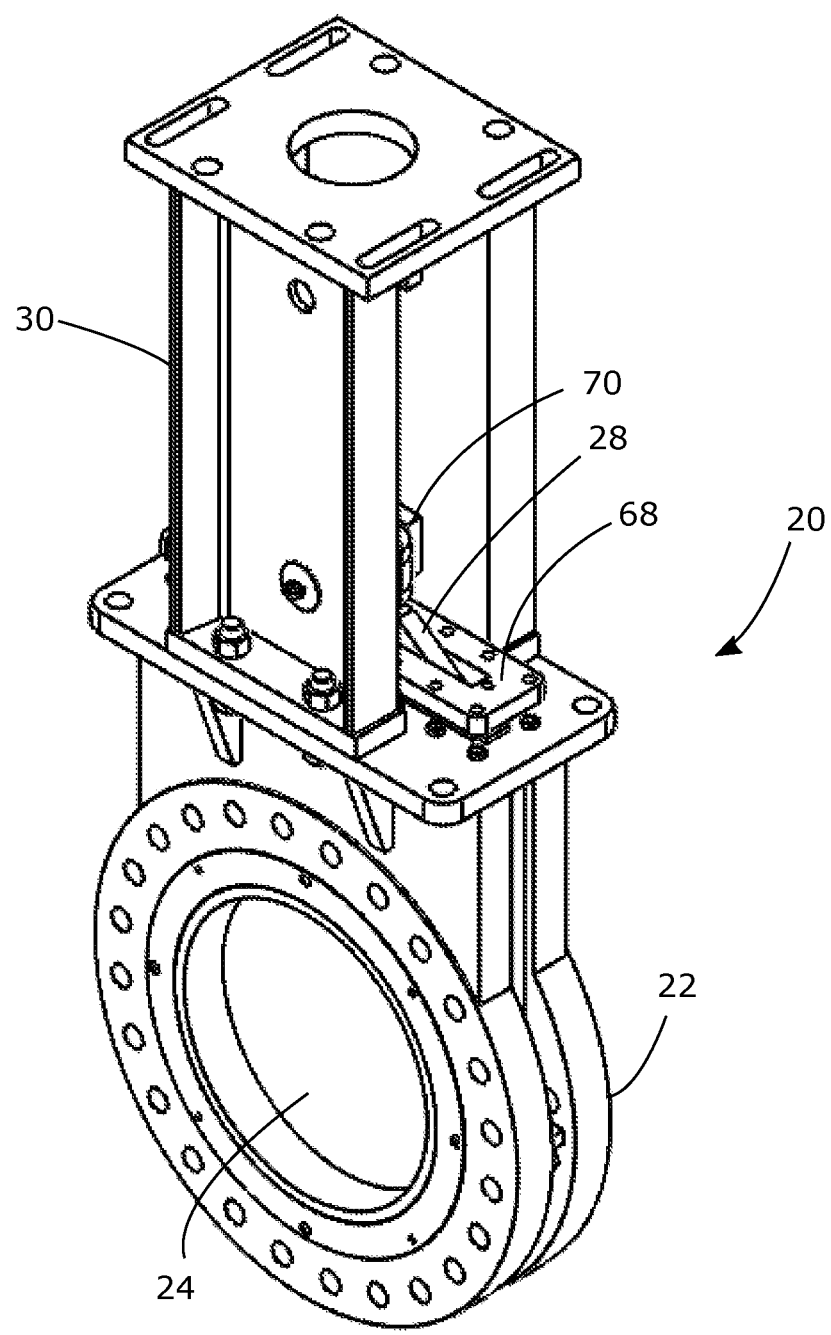
FIG. 1 is an isometric view of an example isolation knife gate valve.
Figure 14:
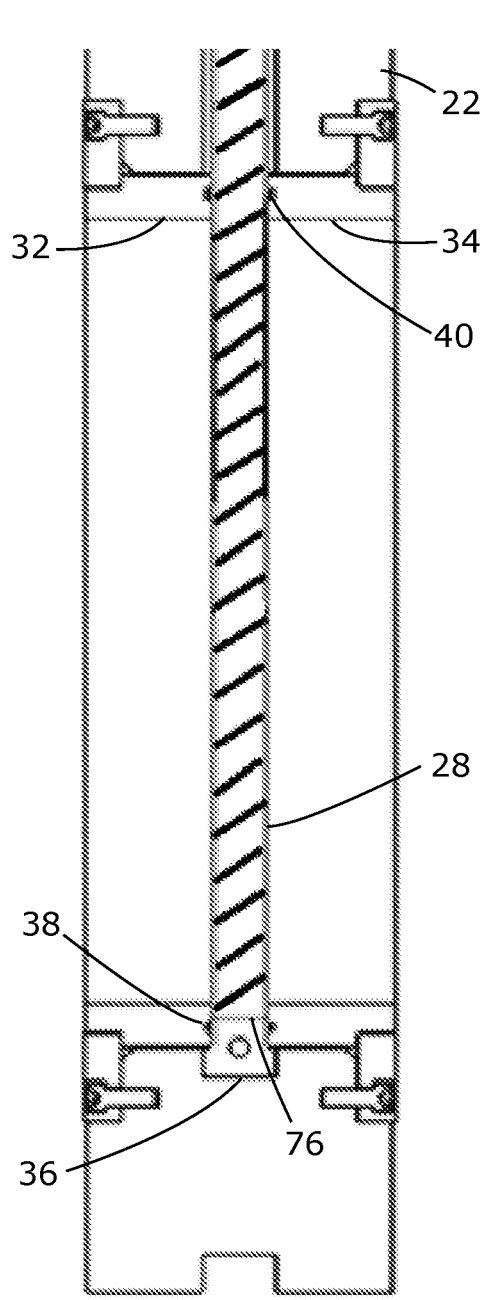
FIG. 14 is closeup side cutaway view of the valve of FIG. 1, with the gate cross-hatched and shown in a closed position.
Figure 15:
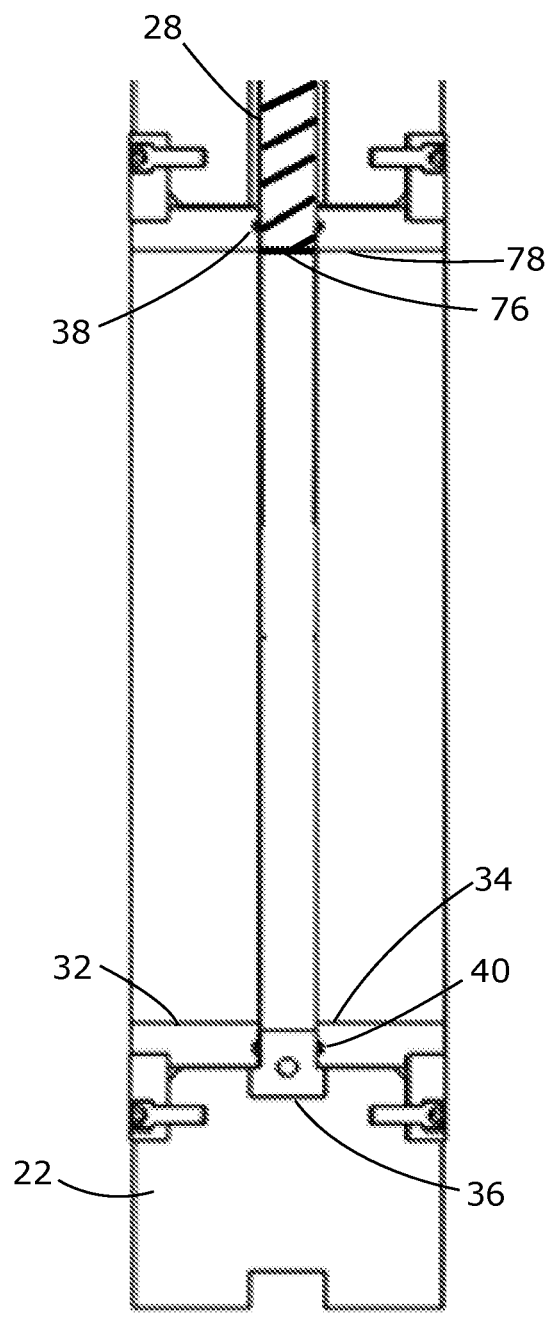
FIG. 15 is closeup side cutaway view of the valve of FIG. 1, with the gate cross-hatched and shown in an operating fully open position.

An isolation knife gate valve (isolation KGV) 20 is shown in FIG. 1. The KGV includes a housing 22 which may be for example a uni-body housing. The housing 22 defines an opening 24 and a gate slot 26, better shown in FIG. 13, extending away from the opening. This direction of the gate slot away from the opening is shown as an upward direction, and installing the valve in this orientation may have advantages for example in terms of protection of valve components, described below, and in preventing pooling within the gate slot. For convenience, this direction is referred to as upward in this description, but the valve need not have any predetermined direction of orientation, and "upward" in this disclosure should be considered to be referring to the direction in which the valve gate opens regardless of actual orientation and not limiting the valve to that orientation. A gate 28 is movable within the gate slot 26 between a closed position where the gate 28 obstructs the opening 24, as shown in FIG. 1 and in FIG. 14, and upward to one or more open positions, for example as shown in FIG. 15. A valve yoke 30 attached to the uni-body housing 22 may include any suitable actuation mechanism 70 or manual control to open and close the valve.

Figure 2:
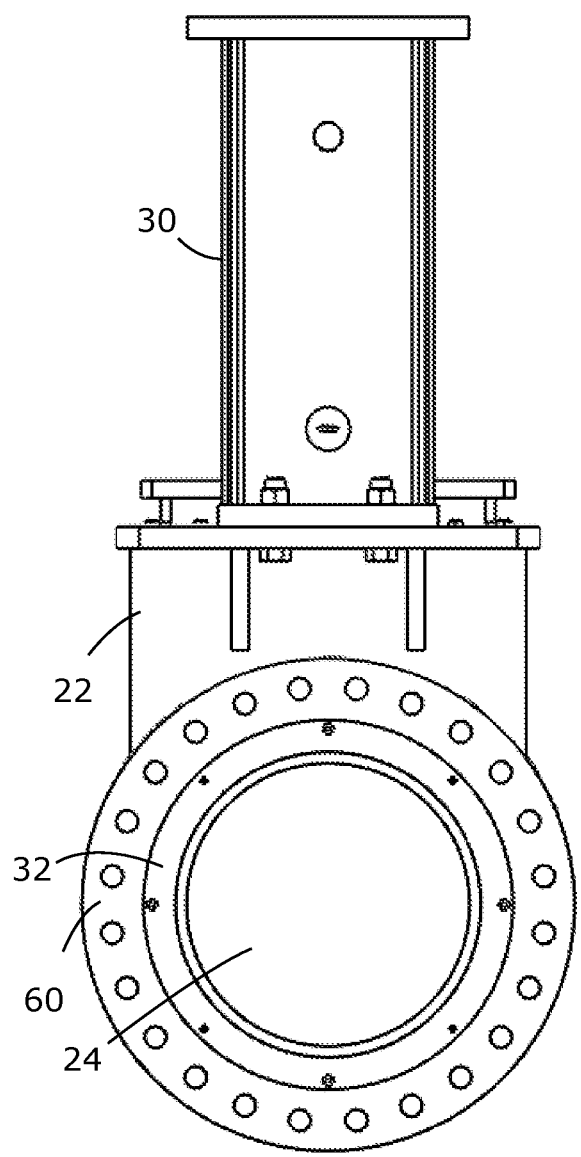
FIG. 2 is a front view of the isolation knife gate valve of FIG. 1.
Figure 3:
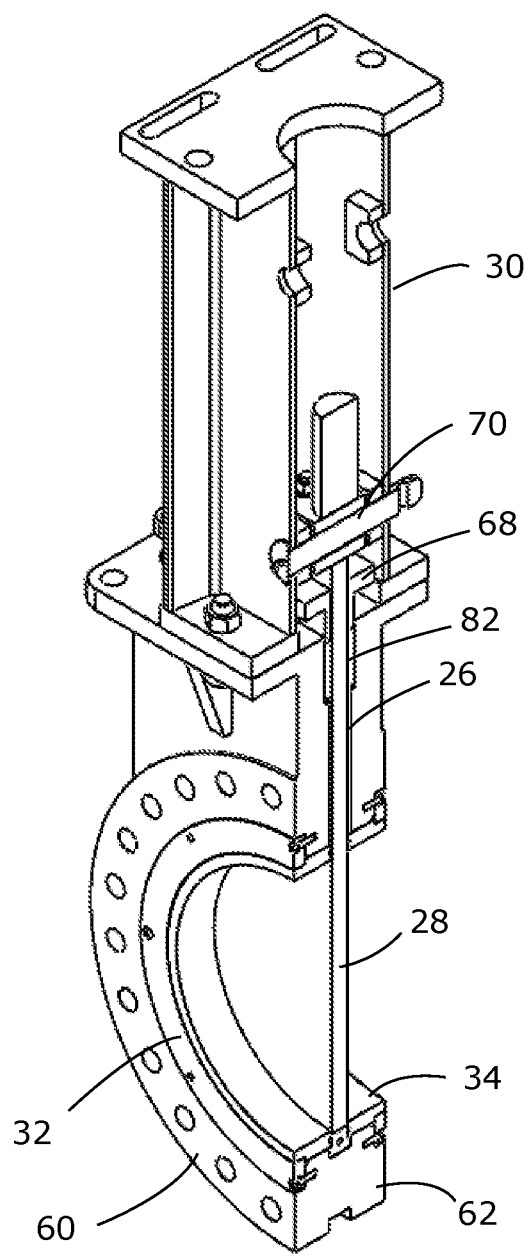
FIG. 3 is a cutaway isometric view of the isolation knife gate valve of FIG. 1.
Figure 4:
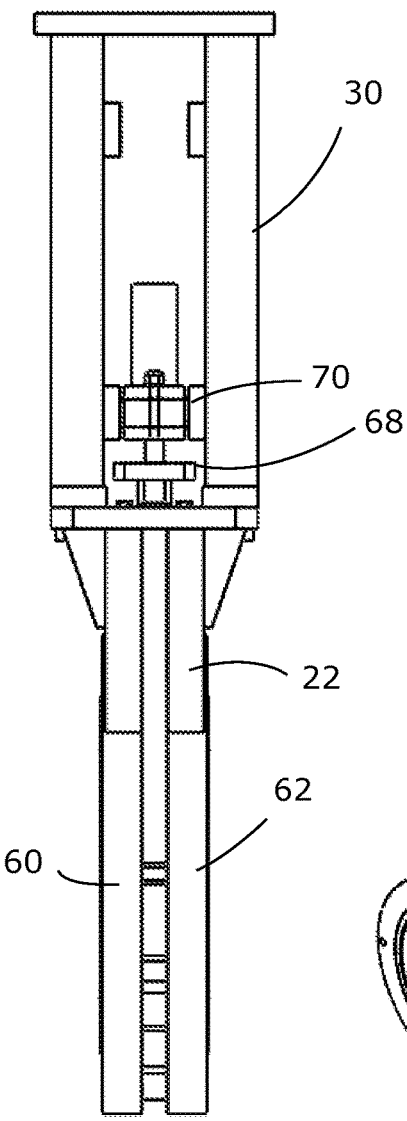
FIG. 4 is a side view of the isolation knife gate valve of FIG. 1.

FIG. 2 shows an end view of the valve 20 of FIG. 1 and FIG. 3 shows a cutaway view. FIG. 4 shows a side profile.

Figure 5:
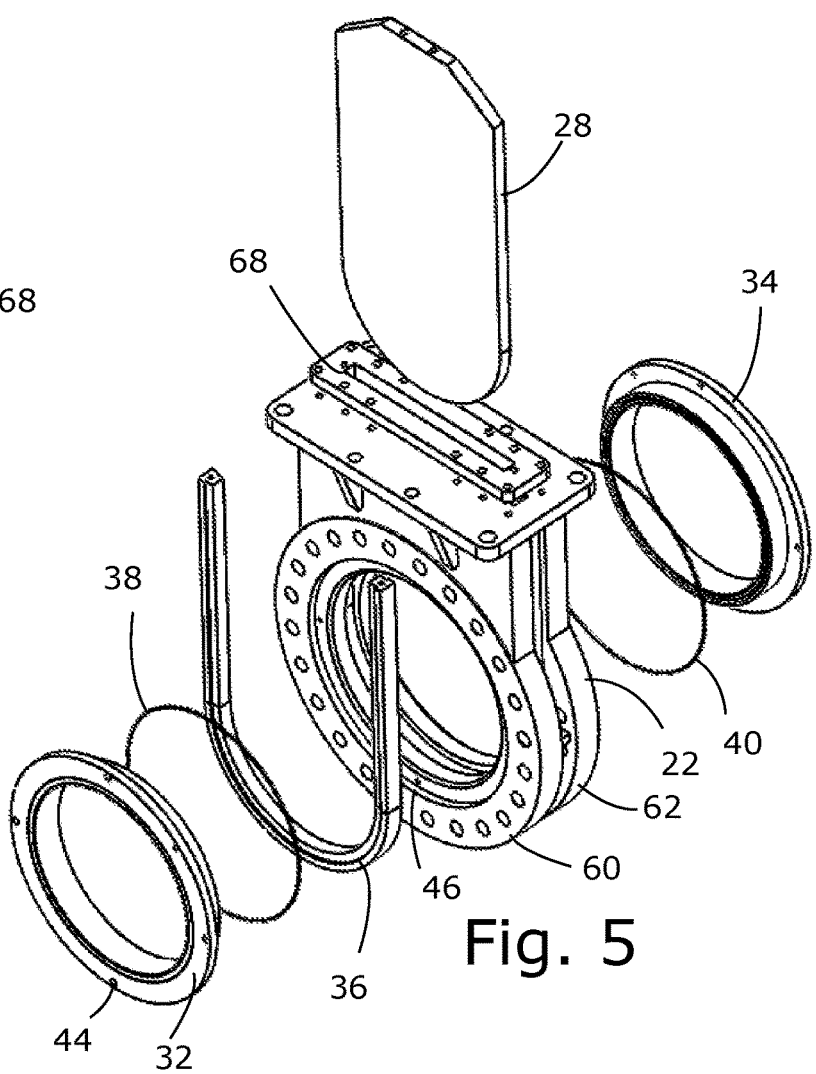
FIG. 5 is an isometric exploded view of the isolation knife gate valve of FIG. 1, with a yoke not shown.
Figure 6:
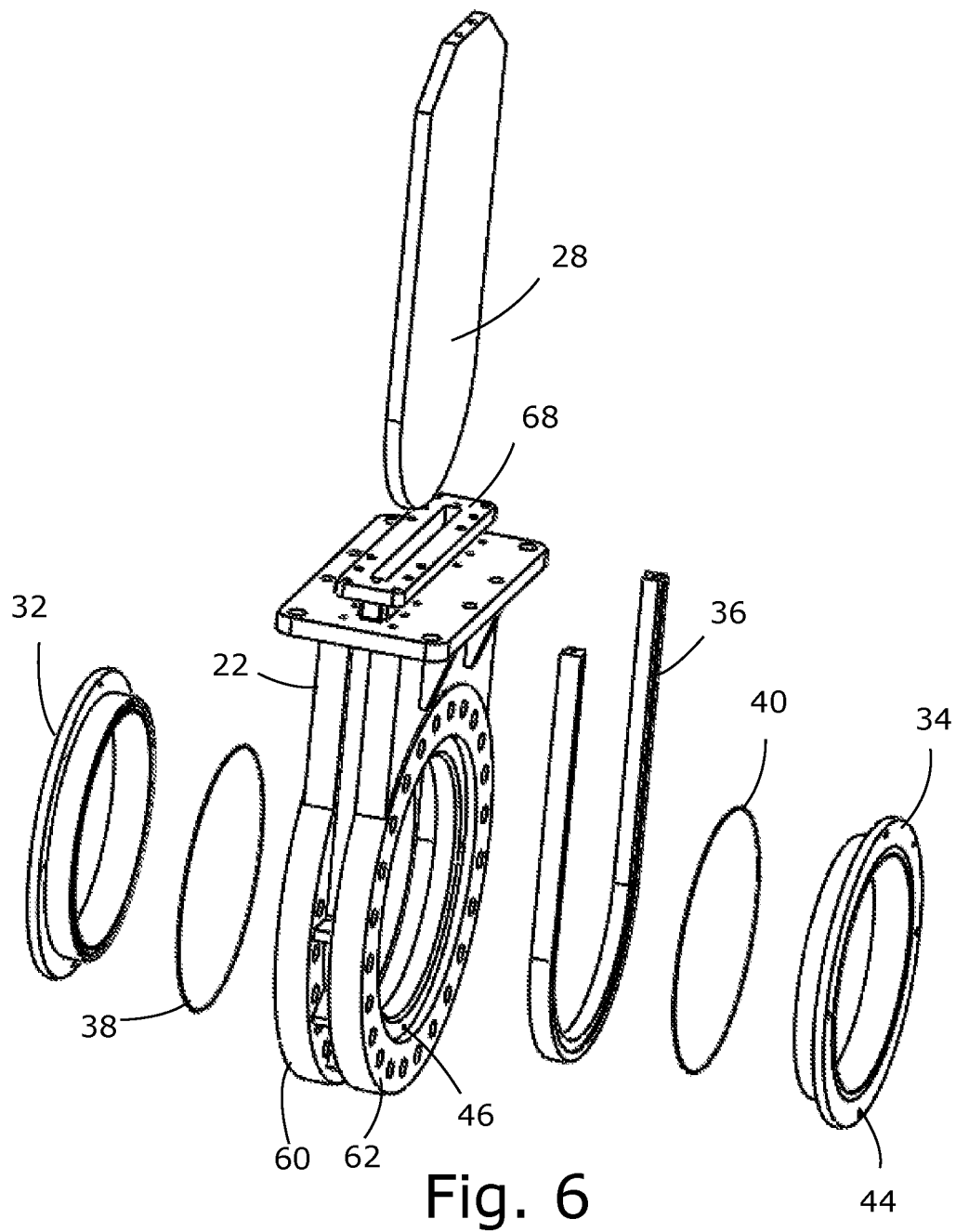
FIG. 6 is another isometric exploded view of the isolation knife gate valve of FIG. 1, also not showing the yoke.

FIGS. 5 and 6 show isometric exploded views of the valve of FIG. 1. As shown in these figures, face seal elements 32 and 34 are attachable to the housing 22. The face seal elements may be positioned interior to couplings 60 and 62 for connecting the valve to pipes. A perimeter seal 36 is also provided to seal around a perimeter of the gate 28. The face seal elements 32 and 34 may include flexible seals 38 and 40 to seal against the gate. In addition to or instead of the flexible seals, they may also provide a metal-to-metal seal as upstream pressure against the gate may push the gate against the downstream face seal element 32 or 34. In the embodiment shown, the flexible seals 38 and 40 are O-rings. The face seal elements 32 and 34 may have a rotational symmetry allowing the face seal elements 32 and 34 to be rotated and reinstalled. This allows possibly uneven wear on portions of the face seal elements 32 and 34, such as the flexible seals 38 and 40, to be evened out. The flexible seal elements, depending on the embodiment, may also be replaced easily when the face seal elements 32 and 34 are removed from the housing 22. For example, where a flexible seal element is an O-ring, it may be installed in a groove 80 (shown in FIGS. 9 and 10) in the corresponding face seal-element and removed from the groove 80 and a replacement installed in the conventional manner or inserting and removing O-rings from grooves. It would also be possible to rotate the O-rings within the face seal elements 32 and 34 by removing and re-installing the O-rings but it is considered easier to rotate each of the face seal elements 32 and 34 as a whole. The face seal elements 32 and 34 may be installed and removed for example using bolts 42 inserted into bolt through-holes 44 to threaded bolt receiving holes 46 in the housing 22. The bolts 42 are not shown in FIGS. 5 and 6, but are shown most clearly in FIGS. 7-10.

The face seal elements 32 and 34 may also act as bore liners. In the embodiment shown, the face seal elements 32 and 34 comprise separate bore liner components 50 and attachment components 48. The bore liner portion or component 50 may comprise metal sealing surfaces 58 and flexible sealing elements 38, 40. The bore liner may be shaped, for example, to be flush with an internal diameter of the pipes to which the valve is to be connected, in order to streamline flow. Further seals, e.g. further O-rings (not shown), may be located in cavities 86 between the face seal elements 32, 34 and the housing 22 in order to prevent leakage from the gate slot 26 through gaps between the face seal elements and the housing. The use of removable face seal elements 32 and 34 as well as the flexible seal element 38 and 40 embedded into these elements allows independent material selection between perimeter seal, O-rings and face seal elements as well as operation at higher pressures. The face seal elements 32 and 34 may each provide a metal surface 58 that adds structural stability to the gate as the gate is pushed against them and can provide an additional face seal against the gate 38 and 40, particularly when it comes to abrasive services such as oils and tailings. The flexible seal elements may be positioned, e.g. embedded at sufficient depth within the face seal elements 32 and 34, and be sufficiently flexible, so as to not prevent contact between the metal surface 58 and the gate 28 at typical operating pressures.

Figure 7:
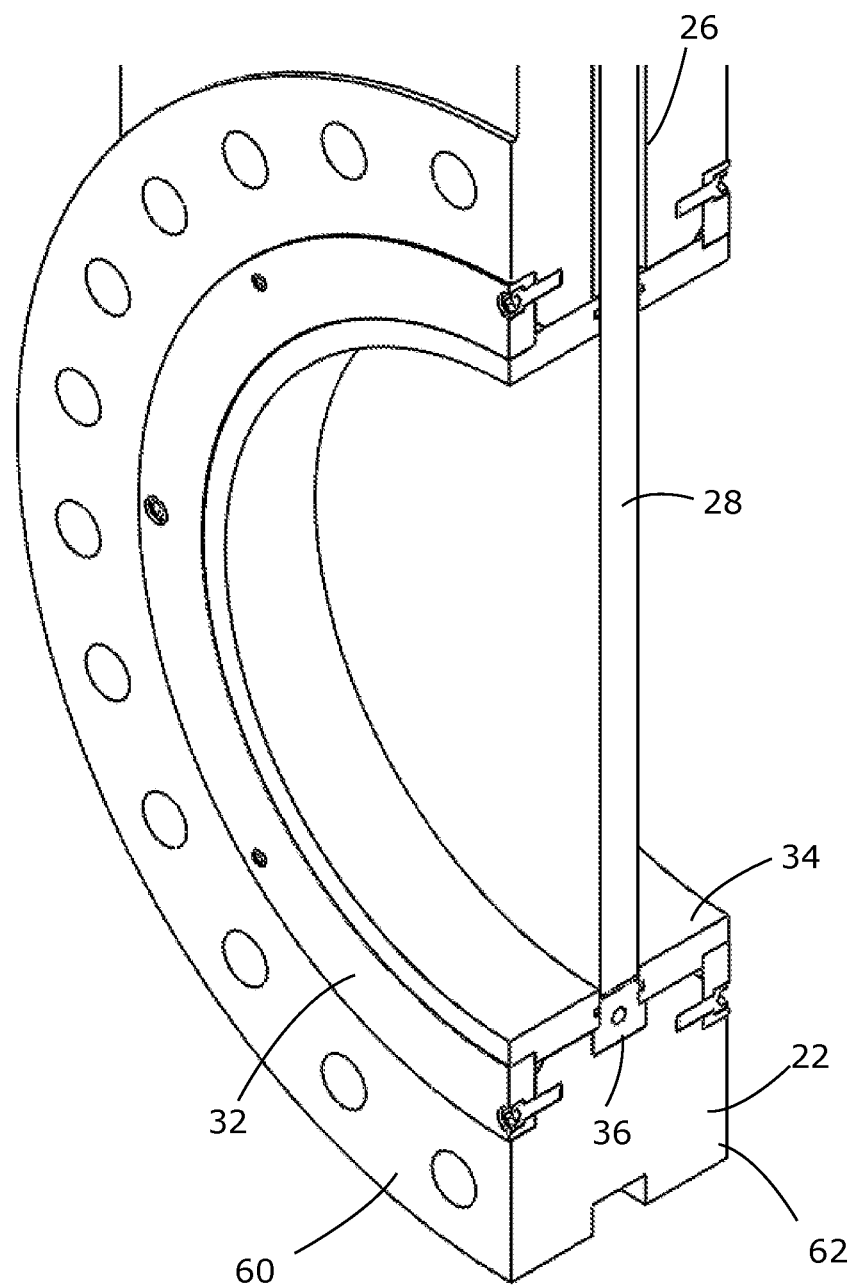
FIG. 7 is a closeup of a portion of the cutaway isometric view of FIG. 3.
Figure 8:
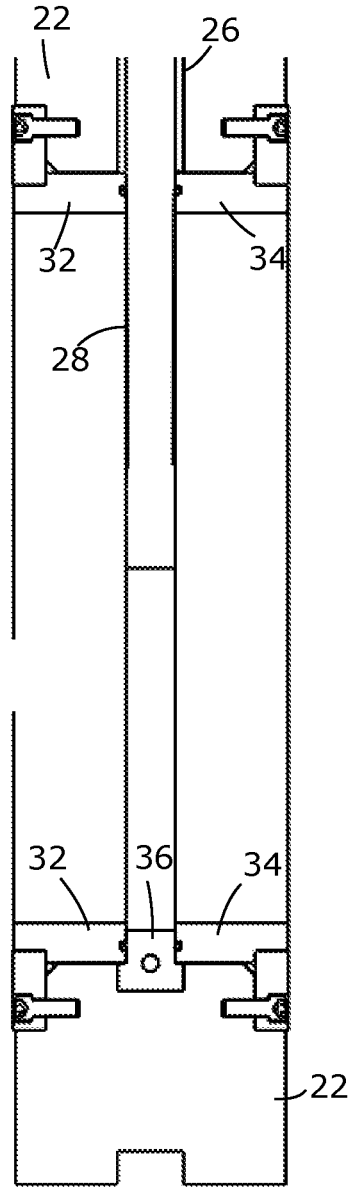
FIG. 8 is a side cutaway view of substantially the same portion of the valve shown in FIG. 7.
Figure 9:
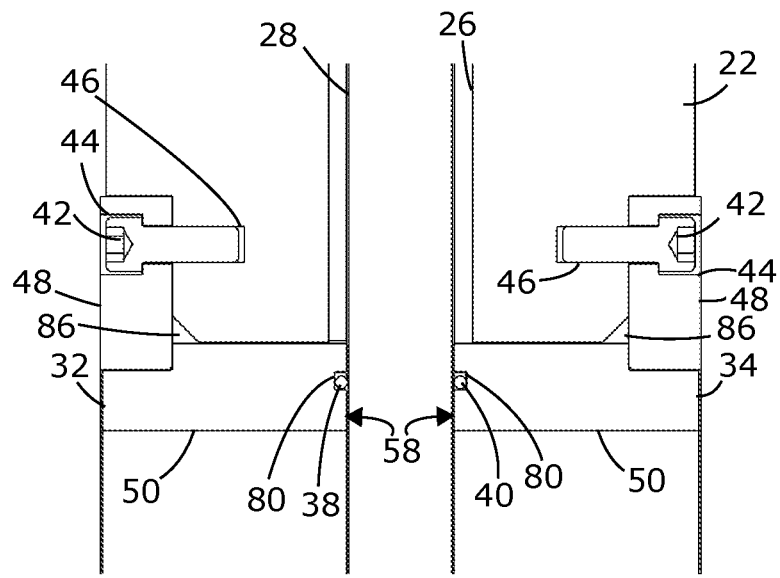
FIG. 9 is a closeup of a top portion of the view of FIG. 8.
Figure 10:
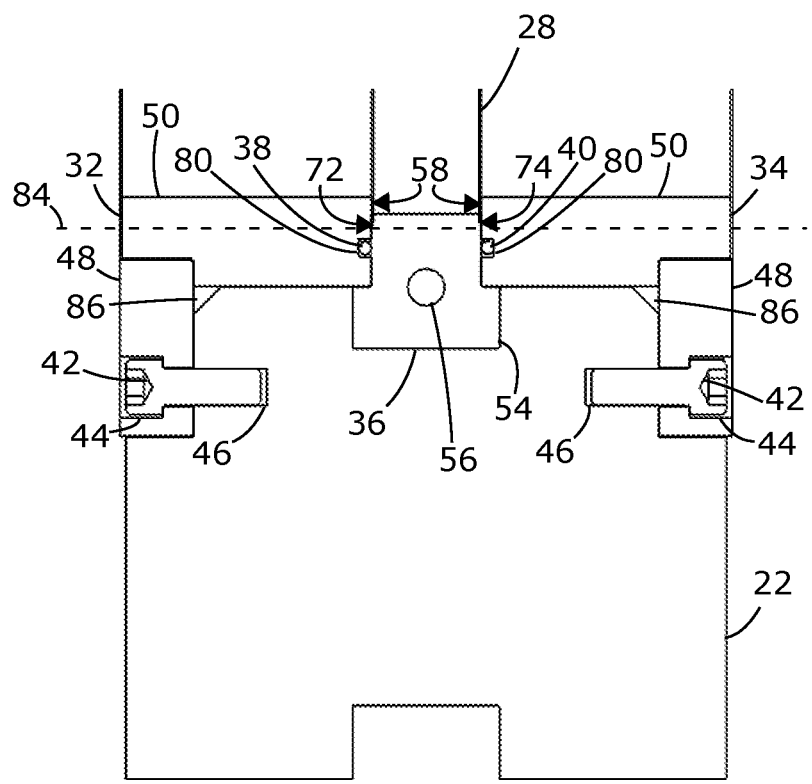
FIG. 10 is a closeup of a bottom portion of the view of FIG. 8.

FIG. 7 is a closeup cutaway view of a lower part of the valve 20. FIG. 8 is a corresponding side cutaway view and FIGS. 9 and 10 are further closeups of portions at the top and bottom respectively of the opening 24. The face seal elements 32 and 34 in these closeups can be seen in this embodiment to each be formed of an outer attachment component 48 through which the bolts 42 are placed and an inner bore liner component 50 which mounts the O-ring 38 and seals against the perimeter seal 36 and gate 28. As can be seen in these figures, in this embodiment the perimeter seal 36 has a T-shaped cross section. The inner rings 50 of the face seal elements 32 and 34 bear against side surfaces 72, 74 of the perimeter seal, which are in this embodiment on the thin portion 52 of the T, and lie on top of the 'bar' 54 of the T holding the perimeter seal 36 in place when the face seal elements 32 and 34 are installed. The perimeter seal 36 may be formed for example of urethane. The perimeter seal may also be stiffened by an internal stiffening member 56 enclosed by and extending lengthwise within the perimeter seal. Where the perimeter seal 36 has a T-shaped cross section, the stiffening member may be located substantially at a junction of the T. The stiffening member 56 may be, for example, a steel rod.

As can be best seen in FIG. 10, the flexible seal elements 38 and 40 may contact the perimeter seal 36 at a lower portion of the valve. When the gate 28 is in the closed position, the gate may push down on the perimeter seal 36 to radially compress the perimeter seal 36. The amount by which the gate 28 compresses the perimeter seal 36 may be selected via configuration of the actuation mechanism 70 or other control element controlling the movement of the gate. In an example where the perimeter seal extends up vertical sides of the gate slot, the stroke of the gate 28 may be set to compress the perimeter seal by an amount equal to an interference fit installation of the gate with the perimeter seal at the sides, thus evenly compressing the perimeter seal when the gate is in the closed position. For example, if the gate is 50" wide, the width left after the perimeter seal 36 is installed and before the gate 28 is installed may be 49.75" which creates 0.125" of interference fit per side. The same 0.125" of interference (compression) may be applied to the bottom of the U-shape of the perimeter seal 36 when the gate 28 full closes on top of the perimeter seal 36. The O-rings 38, 40 may be placed below this compression set to avoid an unnecessary extrusion gap for the O-ring when the gate is closed under pressure. Dashed line 84 shows an exemplary height of a bottom tip of the gate 28 when the gate is in a fully closed position. This compression of the perimeter seal 36 may cause the perimeter seal 36 to further axially press against the face seals including the flexible seals 38 and 40 and metal surfaces 58 of the face seal elements. As shown in FIG. 9, at an upper portion of the valve, the flexible seal elements 38 and 40 may directly contact the face of the gate. The portion of the flexible seal elements 38 and 40 in contact with the perimeter seal may be more than half of the circumference of these elements.

The perimeter seal alone could provide seal/shutoff capability, as could the flexible seals, e.g. O-rings, alone with adjustment of the gate so it closes further down to contact the entire O-rings, as could the metal/metal seat of the gate to the bore liners. However, the combination of these seals together provides better performance than the separate seals and also provides longer life and wear resistance. Valves using the perimeter seal without the face seal elements and O-rings have been found to allow a slight leakage to drip down on the side of the gate opposite to the pressure from the gate slot area. With the addition of the O-rings, this slight leakage is prevented. Substantially zero leakage sealing may be provided, for example compliant with the API 598 standard or ASME B16.34 standard. These standards may be met even at high pressures, for example, at 825 PSI seat test pressure for an ANSI 300 pressure class valve. The O-ring covers the entire flow port in combination with the perimeter seal, and the perimeter seal protects the portion of the O-ring at the bottom of the valve from contact with flow of fluid through the opening 24. An upper portion may be exposed but is subject to less flow than the lower portion in normal use. In addition, these replaceable components may protect the valve body from damage. The valve gate and perimeter seal may in use have substantially the same thickness in contact with the O-rings so that there is no gap as the O-rings transition between contact with the valve gate and contact with the perimeter seal. The perimeter seal, including the thin part of the T-profile if present may have a natural thickness larger than that of the gate, but be compressed to substantially match the gate's thickness by compression by the face seal elements and the O-rings.

The housing 22 may be a uni-body housing. The term "uni-body" in uni-body housing 22 is used to indicate that the housing 22 is formed of a strong, non-disassemblable construction. A uni-body construction may include multiple portions welded together or a single casting. In an example, the uni-body housing is formed by fillet welds on multiple sections of plates to form an integral one-piece construction valve body from the multiple plates welded together. The example valve shown in the figures is formed with integral, full penetration welds. This uni-body construction helps to obtain a high level of strength to withstand possible high internal pressures as well as bending loads transferred from the pipes. The valve shown in FIG. 1 includes couplings 60 and 62 for connecting to pipes (not shown) on each side, where the couplings 60 and 62, here in the form of flanges, are included in the uni-body housing 22. FIGS. 11-13 show the uni-body housing 22 in more detail. FIG. 11 is an isometric view of the uni-body housing 22 and FIGS. 12 and 13 are cutaway isometric views. In these views the gate slot 26 can be seen to extend slightly downward past the opening to define a groove 64 to accommodate a portion of the perimeter seal 36. Alternatively, the face seal elements 32 and 34 could be shaped to accommodate the full profile of the perimeter seal. As can be seen, the gate slot provides a passage for smooth movement of the perimeter seal downward into position via the gate slot.

Also shown in FIGS. 12 and 13 is a pocket 66 for accommodating a transverse seal 82 (shown in FIG. 3) to prevent leakage from the valve into the open air above the valve. The transverse seal may be, for example, a packing seal. Where a packing seal is used, a packing follower 68 may be used to compress the packing. The transverse seal may comprise components extending sideways across each face of the gate between the ends of the perimeter seal. Where the perimeter seal has a T-shaped cross section, the transverse seal components may contact the side surfaces 72, 74 of the thin part of the T-shaped cross section. These side surfaces are shown in FIG. 10 at the bottom of the valve but may continue throughout the length of the perimeter seal. As can be seen in FIGS. 12 and 13, in the embodiment shown the gate slot has a substantially uniform thickness and the perimeter seal is placed around the perimeter of the gate slot without any overhanging portions being present from the gate slot itself. The absence of obstructions within the gate slot enables simple installation of the perimeter seal by inserting the perimeter seal in from the top before the face seal elements are installed. The gate and transverse seal (e.g. packing ropes) can be installed by inserting them after the perimeter seal is in place. The face seals may be installed after the gate in order to avoid impacting the gate on the O-rings, but the opposite order is also possible. Where the transverse seal is a packing seal, it is installed after the gate. There is no order requirement as between installation of the face seals and transverse seal. The perimeter seal can be removed by reversing this procedure and replaced by repeating the install procedure. It is not necessary for the gate slot to be of uniform thickness, as the valve gate does not need to be in contact with the gate slot surfaces directly. The gate slot can be positioned and oriented by contact with the perimeter seal 36, with a packing follower 68 above the packing seal (or by contact with the transverse seal itself), and with the face seal elements 32 and 34 and flexible seal elements 38 and 40.

The transverse seal and the face seal elements may be shaped to secure the perimeter seal in place when installed. For example, in an embodiment in which the perimeter seal has a T-shaped profile as shown, they may be shaped to match the thin portion of the T-profile of the perimeter seal. Along the vertical sides of the valve guide gate slot between the opening and the transverse seal, there may be gaps between the thin portion of the T-profile of the perimeter seal and the valve guide gate slot. These gaps may be filled with a filler material (not shown), for example thermoplastic sheet material, but it has been found that the valve operates successfully with this filler material omitted.

Figure 16:
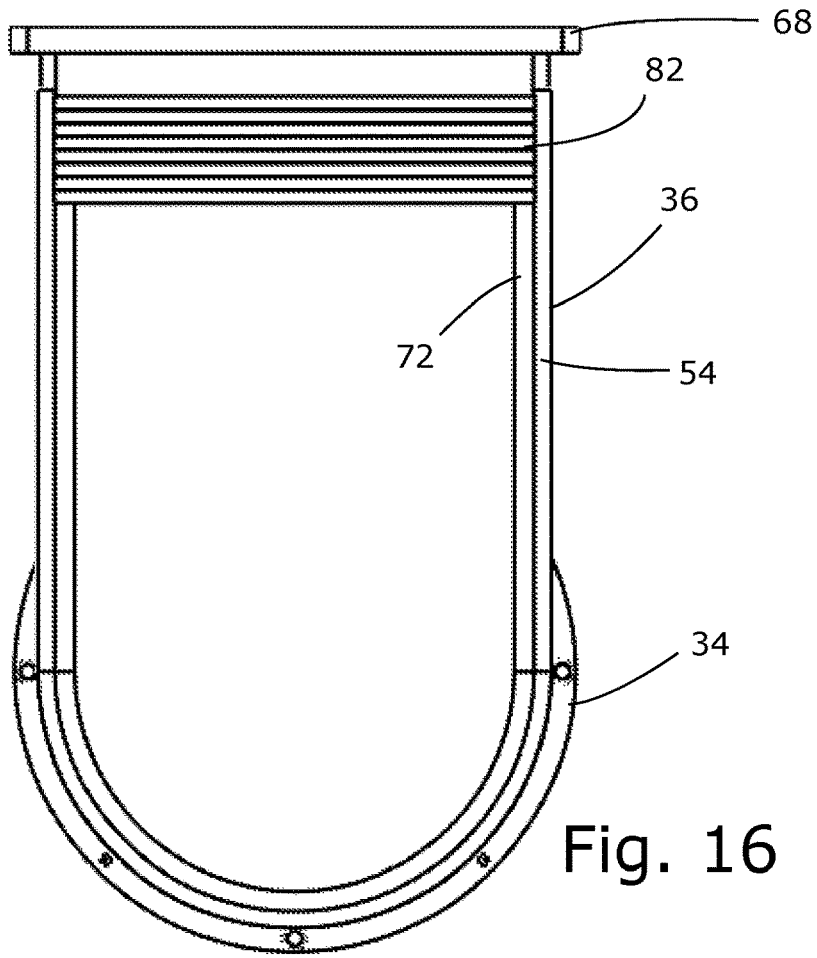
FIG. 16 is a front view of the valve of FIG. 1 with the body and a face seal element omitted to better show a transverse seal and perimeter seal.
Figure 17:
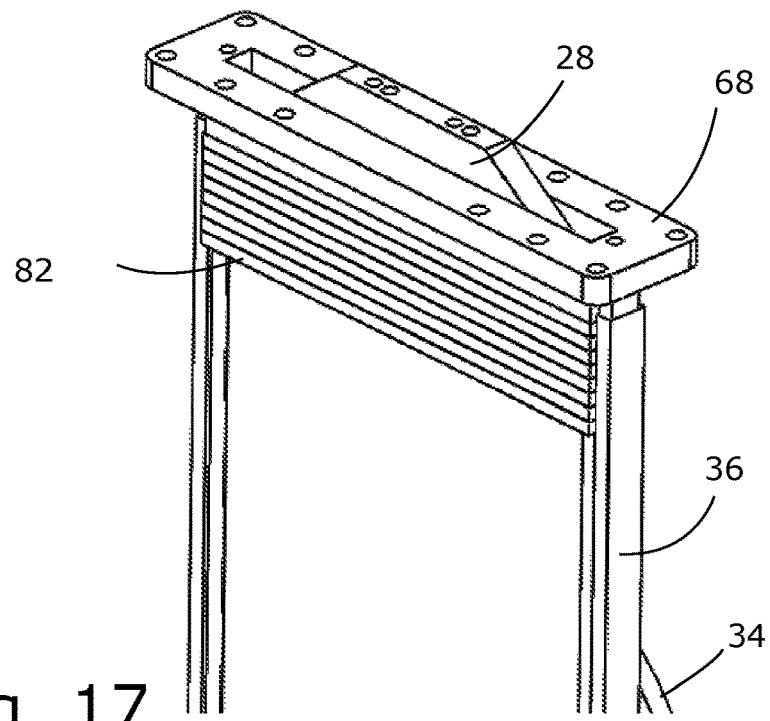
FIG. 17 is an isometric view of the valve of FIG. 1 with the same components omitted as in FIG. 16.

Further details of the transverse seal 82 and its interaction with the perimeter seal 36 in this embodiment can be seen in FIGS. 16-17. The valve body 22 and one of the face seal elements 32 are omitted from FIGS. 16-17 to show the transverse seal 82 and perimeter seal 36 in greater clarity. In the embodiment shown, the transverse seal 82 is a packing seal formed of multiple rows 88 of rope packing. The rope packing may be installed after the urethane seat 36 and gate 28, and squeezed in place one row at a time. The gate 28 may be sized so that the packing seal remains fully in contact with it throughout its range of travel between the open position shown in FIG. 15 and closed position shown in FIG. 14. The rope packing may have ends cut to fit the T-shaped profile of the urethane seat. The multiple rows are selected to ensure atmosphere leakage from the top packing is prevented.

FIGS. 1-13 show the gate 28 in the closed position or with the gate 28 removed from the gate slot 26 entirely. FIGS. 14 and 15 are closeup side cutaway views of a portion of the valve with the gate 28 in a closed position in FIG. 14 and in an operating fully open position in FIG. 15. For clarity, the gate 28 is shown with cross hatching. In an example, in the operating fully open position a bottom tip 76 of the gate 28 may substantially correspond in position to a top 78 of a flow port defined by the bore liners 32, 34. In some embodiments the bottom of the gate 28 overlaps top portions of the flexible seals 38 and 40 in the operating fully open position. As the gate is in normal operation always in contact with the top portions of the flexible seals in these embodiments, potential wear is avoided that might otherwise be caused by the gate impacting perpendicularly on or pinching the flexible seals 38 and 40 or impacting on the face seal elements 32 and 34 in normal operation of the valve. The gate may also be configured to be positioned in use to partially open positions (not shown) between the fully closed position shown in FIG. 14 and the fully open position shown in FIG. 15.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. An isolation knife gate valve comprising:
   a valve housing having first and second pipe couplings for connecting to respective pipes, the valve housing defining an opening and a gate slot extending in a first direction away from the opening;
   a gate movable within the gate slot opposite to the first direction to a closed position in which the gate obstructs the opening and in the first direction to one or more open positions, the gate having first and second faces;
   a perimeter seal mounted within the gate slot for sealing against the gate when the gate is in the closed position; and
   first and second face seal elements removably attachable to the valve housing and when installed positioned interior to the couplings to seal against the first and second faces of the gate, the perimeter seal further comprising first and second side surfaces, and the first and second face seal elements when installed including first and second flexible seal elements extending around the opening, each of the first and second flexible seal elements sealing against the first and second side surfaces of the perimeter seal at respective first circumferential locations around the opening at which the first and second flexible seal elements do not seal against the gate, the first and second flexible seal elements also respectively sealing against the first and second faces of the gate at respective second circumferential locations around the opening, when the gate is in the closed position.

2. The isolation knife gate valve of claim 1 in which the valve housing is a uni-body valve housing.

3. The isolation knife gate valve of claim 1 in which the first and second flexible seal elements each comprise an O-ring.

4. The isolation knife gate valve of claim 1 in which when the isolation knife gate valve is in an operating fully open position, a portion of the first and second faces of the gate remain in contact with the first and second flexible seal elements.

5. The isolation knife gate valve of claim 1 in which the first and second face seal elements are also configured to seal against the gate with a metal-to-metal seal.

6. The isolation knife gate valve of claim 1 in which the perimeter seal has a T-shaped cross section defining a thin portion of the perimeter seal and a bar of the perimeter seal, the thin portion contacting the gate and defining the first and second side surfaces.

7. The isolation knife gate valve of claim 6 in which the perimeter seal has a stiffening member extending lengthwise through the perimeter seal, the stiffening member being located substantially at a junction of the T-shaped cross section.

8. The isolation knife gate valve of claim 6 in which the bar of the perimeter seal is mounted in a groove in the valve housing, the first and second face seal elements overlapping edges of the groove to constrain the perimeter seal within the groove.

9. The isolation knife gate valve of claim 1 in which the perimeter seal includes a stiffening member extending lengthwise within the perimeter seal.

10. The isolation knife gate valve of claim 1 in which the perimeter seal has end portions extending along the gate slot away from the opening, the end portions sealing against respective sides of the gate.

11. The isolation knife gate valve of claim 10 in which the isolation knife gate valve includes a transverse seal sealing against the faces of the gate within the gate slot, the end portions of the perimeter seal extending to the transverse seal.

12. The isolation knife gate valve of claim 11 in which the valve housing is configured to allow the gate and transverse seal to be removable from the gate slot away from the opening, and to allow the perimeter seal to be removable from the gate slot away from the opening when the gate and the transverse seal are removed.

13. The isolation knife gate valve of claim 1 in which the first and second face seal elements comprises bore liners.

14. The isolation knife gate valve of claim 13 in which the bore liners are configured to be flush with an internal diameter of the respective pipes.

15. The isolation knife gate valve of claim 1 in which the first and second face seal elements are configured to be bolted to the valve housing.

16. A method of service of an isolation knife gate valve of claim 1, comprising removing one or more of the first and second face seal elements, repairing or replacing the one or more of the first and second face seal elements, and attaching the repaired or replaced one or more of the first and second face seal elements in installed position interior to the couplings.

17. A method of service of the isolation knife gate valve of claim 12, comprising removing the first and second face seal elements, removing the gate and transverse seal along the gate slot away from the opening, removing the perimeter seal along the gate slot away from the opening, repairing or replacing the perimeter seal, installing the repaired or replaced perimeter seal along the gate slot toward the opening, and reinstalling, or replacing and reinstalling, the gate, the transverse seal and the first and second face seal elements.

\* \* \* \* \*